US009811437B1

(12) United States Patent
Leverich et al.

(10) Patent No.: US 9,811,437 B1
(45) Date of Patent: *Nov. 7, 2017

(54) SYSTEMS AND METHODS FOR MONITORING AND ACTING ON LOGGED SYSTEM MESSAGES

(71) Applicant: United Services Automobile Association (USAA), San Antonio, TX (US)

(72) Inventors: Josiah J. Leverich, San Antonio, TX (US); Max Hobrecht, Jr., San Antonio, TX (US)

(73) Assignee: United Services Automobile Assocation (USAA), San Antonio, TX (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/482,018

(22) Filed: Sep. 10, 2014

Related U.S. Application Data

(63) Continuation of application No. 13/525,723, filed on Jun. 18, 2012, now Pat. No. 8,868,983, which is a continuation of application No. 12/048,863, filed on Mar. 14, 2008, now Pat. No. 8,205,122.

(51) Int. Cl.
*G06F 11/00* (2006.01)
*G06F 11/34* (2006.01)
*G06F 11/07* (2006.01)

(52) U.S. Cl.
CPC ...... *G06F 11/3409* (2013.01); *G06F 11/0793* (2013.01)

(58) Field of Classification Search
CPC .............. G06F 11/076; G06F 11/0769; G06F 11/0772; G06F 11/0793; G06F 11/3409; H04L 41/064; H04L 41/0645; G05B 23/0218; G05B 23/0224; G05B 23/0235
See application file for complete search history.

(56) References Cited

U.S. PATENT DOCUMENTS

| | | | | |
|---|---|---|---|---|
| 5,463,768 A * | 10/1995 | Cuddihy | ............... | G06F 11/079 714/37 |
| 5,572,672 A * | 11/1996 | Dewitt | .................. | G06F 11/323 702/176 |
| 6,643,801 B1 * | 11/2003 | Jammu | .............. | G05B 19/4184 701/29.4 |
| 7,069,480 B1 * | 6/2006 | Lovy | .................. | G06F 11/3495 714/47.2 |
| 7,434,109 B1 * | 10/2008 | Stabile | .................... | H04L 43/04 709/223 |

(Continued)

*Primary Examiner* — Marc Duncan
(74) *Attorney, Agent, or Firm* — Baker Hostetler LLP

(57) ABSTRACT

A computer operations center that has a number of computing systems, where each computing system issues system messages regarding such computing system. Each issued system message from each computing system is stored in a message logging database. The system messages stored in the message logging database are monitored for predetermined patterns, and upon detecting a particular pattern in the system messages, a predetermined action corresponding to the detected pattern is taken. The detected pattern anticipates an occurrence of an unwanted system event, and the corresponding action is intended to prevent or at least minimize the unwanted system event.

20 Claims, 5 Drawing Sheets

(56) References Cited

U.S. PATENT DOCUMENTS

| | | | | |
|---|---|---|---|---|
| 8,205,122 B1* | 6/2012 | Leverich | ............. | G06F 11/3072 714/47.1 |
| 8,868,983 B1* | 10/2014 | Leverich | ............. | G06F 11/3006 714/47.1 |
| 2004/0078099 A1* | 4/2004 | Varma | ................... | B61C 17/04 700/52 |
| 2004/0153844 A1* | 8/2004 | Ghose | ................... | H04L 41/064 714/42 |
| 2004/0168108 A1* | 8/2004 | Chan | ................. | G05B 23/0283 714/47.1 |
| 2005/0015376 A1* | 1/2005 | Fraser | ................... | G06Q 30/02 |
| 2005/0081114 A1* | 4/2005 | Ackaret | ............... | G06F 11/076 714/42 |
| 2005/0246590 A1* | 11/2005 | Lancaster | ............. | G06F 11/076 714/47.2 |
| 2006/0010352 A1* | 1/2006 | Mukherjee | .......... | G06F 11/0724 714/47.2 |
| 2008/0168308 A1* | 7/2008 | Eberbach | .............. | G06F 11/008 714/26 |
| 2008/0201601 A1* | 8/2008 | Kaefer | ............... | G06F 11/0748 714/2 |
| 2009/0037772 A1* | 2/2009 | Wegerich | ........... | G05B 23/0254 714/26 |

\* cited by examiner

SYSTEMS AND METHODS FOR MONITORING AND ACTING ON LOGGED SYSTEM MESSAGES

CROSS-REFERENCE TO RELATED APPLICATION(S)

The present application is a Continuation of U.S. patent application Ser. No. 13/525,723, filed Jun. 18, 2012, which is a Continuation of U.S. patent application Ser. No. 12/048,863, filed Mar. 14, 2008, now U.S. Pat. No. 8,205,122, and also shares a common title and disclosure with the following applications, each of which is hereby incorporated herein by reference in its entirety:

U.S. patent application Ser. No. 12/048,900, filed Mar. 14, 2008; and

U.S. patent application Ser. No. 12/048,964, filed Mar. 14, 2008.

FIELD

The present disclosure is directed to systems and methods that provide a monitor and acting on logged system messages such as may be provided by the various computing operations of a relatively large organization. More particularly, the present disclosure is directed to such systems and methods that are particularly applicable in cases where a relatively large number of such system messages are typically logged. Even more particularly, the present disclosure is directed to such systems and methods where the monitoring mechanism detects a trend based on the monitored logged system messages and takes an action in response to the detected trend.

BACKGROUND

In the case of a relatively large organization such as a corporation or the like, it is known that such an organization may have relatively large and extensive computing operations. For example, a multi-national corporation that performs a large amount of its business by way of the Internet or the like typically has such relatively large and extensive computing operations. Moreover, any organization or business or the like that maintains large amounts of data, such as for example customer data or operations data, likewise typically has such relatively large and extensive computing operations.

Such relatively large and extensive computing operations may be performed for the organization at one or more computing operations centers. As may be appreciated, such a computing operations center is usually at a single physical location, although such a center may also be geographically dispersed if necessary and/or desired. At any rate, such a computing operations center may have systems including various servers, data stores, communications equipment, databases, interfaces, and other systems relating to the operations of the organization. Significantly, each such system may from time to time issue a system message regarding the operations of such system.

As is known, each such system message may encompass most any notifying message deemed necessary or desirable, and typically includes error messages, maintenance messages, status messages, and the like. Thus, each such system message may be of most any type or variety, and in fact may be relatively serious, such as for example that data has been lost or the system is going to shut down, relatively insignificant, such as for example that a particular user has logged in, or somewhere in between, such as for example that regular maintenance should be performed soon.

Notably, all system messages as sent from most any system of a computing operations center may be gathered and stored in a centralized location so that such messages may be reviewed as necessary in a dedicated fashion. One example of such a centralized location is a message logging database, as is known. Such a message logging database for a relatively large organization may receive and store a relatively large number of system messages from the computing operations center thereof, perhaps on the order of 1000 or even 10000 messages per minute. Accordingly, manually reviewing each such message may be relatively difficult if not impossible. Nevertheless, the information incumbent in the many messages may be particularly useful, and accordingly the message logging database may be accessed by a system operator or the like by way of an appropriate interface in order to glean such information. However, such a message logging database typically does not proactively acting on any of the systems messages received and stored thereat in order to prevent any 'bad' system event, such as for example a server crash, a data loss, loss of a communications link, etc. Instead, the database is reviewed only after such a 'bad' system event has occurred in order to glean any information relating to related events that preceded the 'bad' system event.

Accordingly, a need exists for systems and methods for proactively acting on systems messages received and stored at a message logging database or the like. More particularly, a need exists for such systems and methods that discern trends from the systems messages in the database and that take appropriate action in response to discerning such a trend. Even more particularly, a need exists for such systems and methods that look for predetermined patterns in the logged systems messages and upon identifying such predetermined trends take corresponding actions.

SUMMARY

The aforementioned needs are satisfied at least in part by a system and method with regard to a computer operations center that has a number of computing systems, where each computing system issues system messages regarding such computing system. Each issued system message from each computing system is stored in a message logging database. The system messages stored in the message logging database are monitored for predetermined patterns, and upon detecting a particular pattern in the system messages, a predetermined action corresponding to the detected pattern is taken. The detected pattern anticipates an occurrence of an unwanted system event, and the corresponding action is intended to prevent or at least minimize the unwanted system event.

In a first manner of defining a particular pattern, a particular message or type of message of interest is identified, and a threshold therefor is defined regarding a frequency with which such message is received at the message logging database, Also, the corresponding action is defined for the threshold, where such corresponding action is to be taken if the threshold is surpassed.

In a second manner of defining a particular pattern, artificial intelligence is performed on a set of the messages from the message logging database so as to learn the particular pattern. The learned pattern includes a particular message or type of message of interest and a threshold for the particular message or type of message regarding a frequency with which such message is received at the message logging database. The corresponding action is then defined for the threshold, where such corresponding action is to be taken if the threshold is surpassed;

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
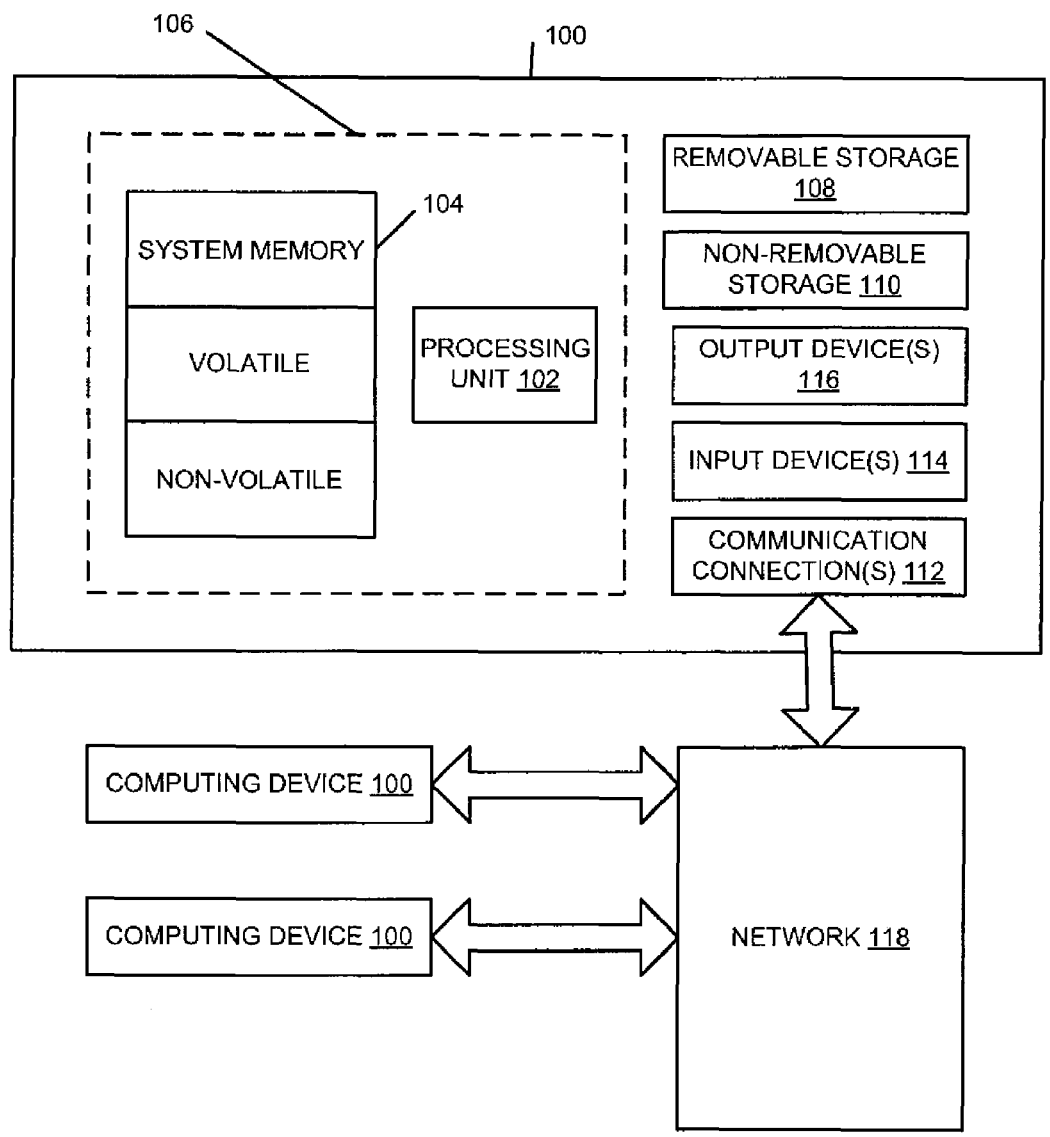
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

System Message Logging

Figure 2:
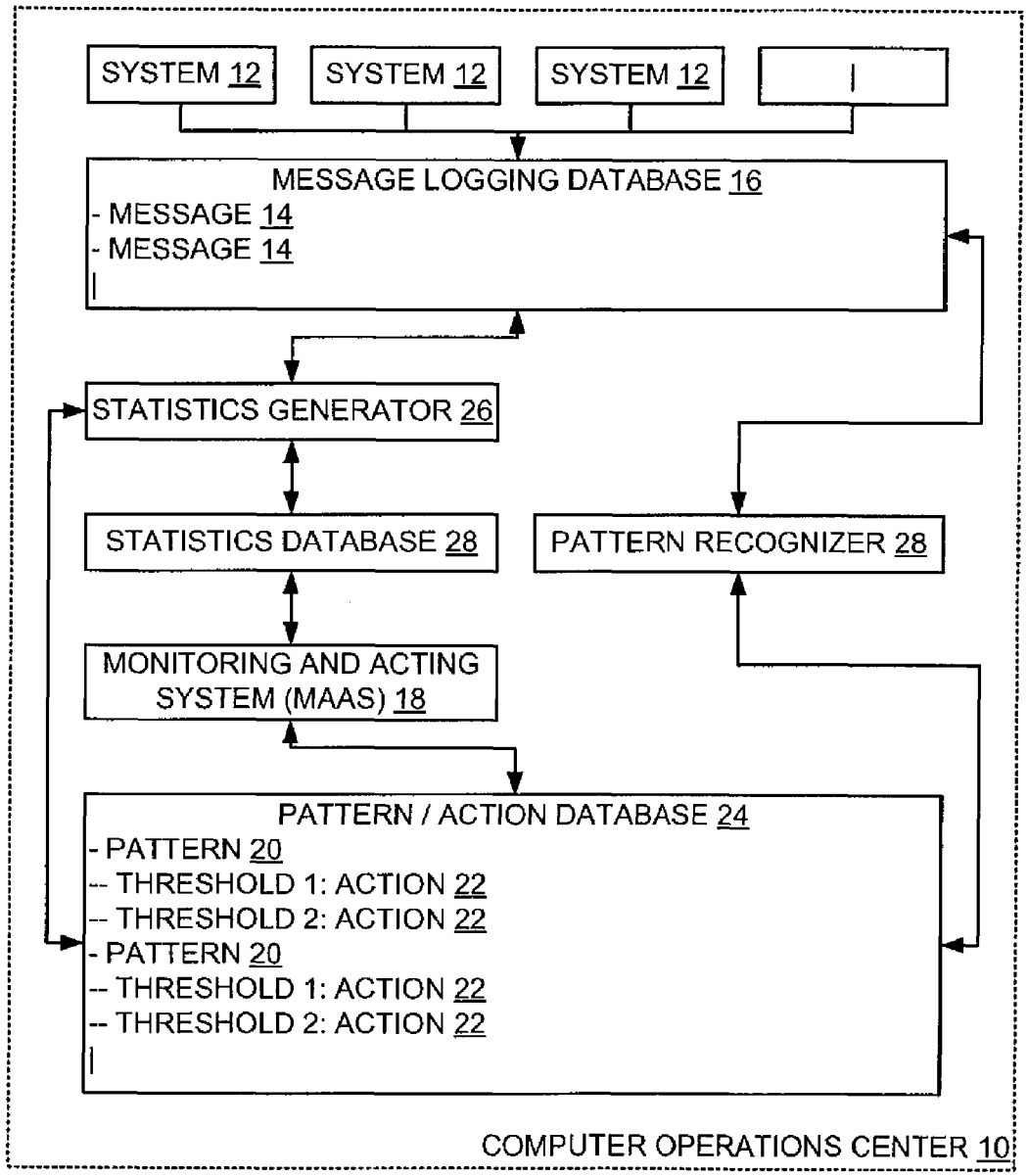
FIG. 2 is a block diagram of a system for monitoring and acting on messages received at a message logging database of a computing operations center with multiple computing systems in accordance with various embodiments of the present innovation.

Turning now to FIG. 2, it is seen that an organization such as a corporation or the like has a computer operations center 10 with a number of systems 12 that implement functions of the organization or the like. Such organization may be a corporation or another form of business, a governmental entity, a university or other school, or any other appropriate organization without departing from the spirit and scope of the present innovation, and the center 10 may be most any form of computing operations center as may be employed by such an organization. Typically, the center 10 and the systems 12 are relatively large and maintain and operate on relatively large amounts of electronic data, although the size of such center 10, systems 12, and data is not considered to be a limiting factor with regard to the present innovation.

As was alluded to above, the computing operations center 10 may physically be located at a single physical location or geographically dispersed, and may be the sole center 10 of the organization or one of several. At any rate, the systems 12 of the center may for example include servers, data storage, communications equipment, databases, interfaces, and the like as may be used to effectuate the operations of the organization. Significantly, each such system 12 may from time to time issue a system message 14 regarding the operations of such system 12. As known, each such system message 14 may be most any message relevant to the operation of such system 12, and may include error messages, maintenance messages, status messages, and the like.

While each such system message 14 is at least minimally important, it is to be understood that some messages 14 have more importance than others. For example, a message 14 that a server has crashed or that data has been lost may very well be considered more important than a message 14 that a process is finished and shutting down. Nevertheless, it is to be appreciated that most any message 14 may be potentially useful in detecting a potential problem or determining how a problem arose, and accordingly very few if any messages 14 can be dismissed out of hand.

Accordingly, and as was set forth above, each system message 14 as sent from most any system 12 of the computing operations center 10 is gathered and stored in a centralized location so that the message can at least potentially be reviewed. In various embodiments of the present innovation, the centralized location is a message logging database 16 or the like. Such a message logging database 16 may be most any appropriately sized and configured database without departing from the spirit and scope of the present innovation. For example, for a relatively large organization, such a database 16 may expect to receive upwards of 1000 or even 10000 messages 14 per minute from the systems 12 of the center 10, and accordingly the database 16 should be able to receive and store (i.e., 'log') each such message 14. Such a database 16 is generally known or should be apparent to the relevant public and therefore need not be set forth herein in any detail other than that which is provided.

Typically, each logged message 14 is not manually reviewed, and indeed such manual review may be difficult if not impossible at high logging rates. Instead, such logged reviews are typically searched or otherwise traversed upon the occurrence of an event, perhaps to determine the nature of the event, to determine how the event occurred, to determine what may have caused the event, or the like. Thus, the database 16 may include such searching functionality or may be accessible by a user interface that implements such searching functionality, or the like.

However, and notably, such a message logging database 16 typically does not proactively act on any of the logged system messages 14. That is, the database 16 does not itself take any action based on a particular message 14, except perhaps to inform an operator or the like if the message 14 is deemed to be of sufficient importance.

Message Monitoring and Acting System

Accordingly, in various embodiments of the present innovation, systems and methods are provided that monitor the logged system messages 14 at the database 16 and that act on such messages 14 by taking predetermined actions in response to detecting that predetermined events have occurred as represented by the messages 14. With such systems and methods, then, the monitored system messages 14 may anticipate the occurrence of a 'bad' system event, and an action may be taken to prevent the 'bad' system event or at least minimize the result thereof.

As seen in FIG. 2, a monitoring and acting system (MAAS) 18 is provided to implement the various embodiments of the present innovation. As shown, the MAAS 18 is separate from the message logging database 16, although such MAAS 18 may alternately be included within the database 16 without departing from the spirit and scope of the present innovation. Principally, the MMS 18 operates by monitoring the messages 14 logged at the database 16, and in particular by monitoring for predetermined patterns 20 of such messages 14 that have been found to anticipate one or more of such 'bad' system events. Once the MAAS 18 has found a particular pattern 20 of logged messages 14 in the database 16, the MAAS 18 then takes a corresponding predetermined action 22 in response to the found pattern 20.

Thus, and in a particular scenario, it may be that from experience an operator of a particular system 12 in the center 10 may have found that the system 12 issues a particular type of message 14 no more than once every 60 minutes if the system 12 is operating normally. However, the operator may also have found that if the particular type of message 14 is issued more than once every 60 minutes, a 'bad' system event is in danger of occurring unless a first particular maintenance operation is performed on the system 12. Moreover, if the particular type of message 14 is issued more than once every 30 minutes, the 'bad' system event is in danger of occurring unless a second particular maintenance operation is performed on the system 12, and if the particular type of message 14 is issued more than once every minute, the 'bad' system event is inevitable unless the system 12 is shut down.

Accordingly, a pattern 20 as may be employed by the MAAS 18 can be derived based on the particular scenario. In such derived pattern 20, and as may now be appreciated, the rate of occurrence of the particular type of message 14 is to be monitored by the MAAS 18, three thresholds are set out with regard thereto, and each threshold includes a corresponding action 22 to be taken by the MAAS 18. Thus, and according to the derived pattern 20, if the rate of occurrence of the particular type of message 14 as monitored by the MAAS 18 exceeds the first threshold of once every 60 minutes, the action 22 taken by the MAAS 18 may be to issue a notification to one or more operators to initiate the first maintenance operation. Such notification may be by way of a system message, an electronic mail (e-mail) message, an automated telephone call, an annunciating device, or the like. Alternately, the action 22 taken by the MAAS 18 may be to initiate the first maintenance operation itself, presuming that the MAAS 18 is indeed capable of so initiating the operation, and perhaps also to issue a aforementioned notification to one or more operators that the first maintenance operation was initiated.

In a similar manner, and according to the derived pattern 20, if the rate of occurrence of the particular type of message 14 as monitored by the MAAS 18 exceeds the second threshold of once every 30 minutes, the action 22 taken by the MAAS 18 may be to issue a similar notification to initiate the second maintenance operation and/or to initiate the second maintenance operation itself, presuming again that the MAAS 18 is indeed capable of so initiating the operation. Also in a similar manner, and according to the derived pattern 20, if the rate of occurrence of the particular type of message 14 as monitored by the MAAS 18 exceeds the third threshold of once every minute, the action 22 taken by the MAAS 18 may be to issue a similar notification to shut down the system 12 and/or to shut down the system 12 itself, presuming once again that the MAAS 18 is indeed capable of so doing. Note here that inasmuch as there may be urgency by the time the third threshold is achieved, it may be more likely that the MAAS 18 itself performs the shut down action 22.

Notably, each pattern 20 that the MAAS 18 monitors for is appropriately defined and constructed, and is stored in a pattern/action database 24 or the like. The structure of the pattern/action database 24 should be apparent to the relevant public based on the present disclosure and therefore need not be set forth in any detail except that which is provided.

Figure 3:
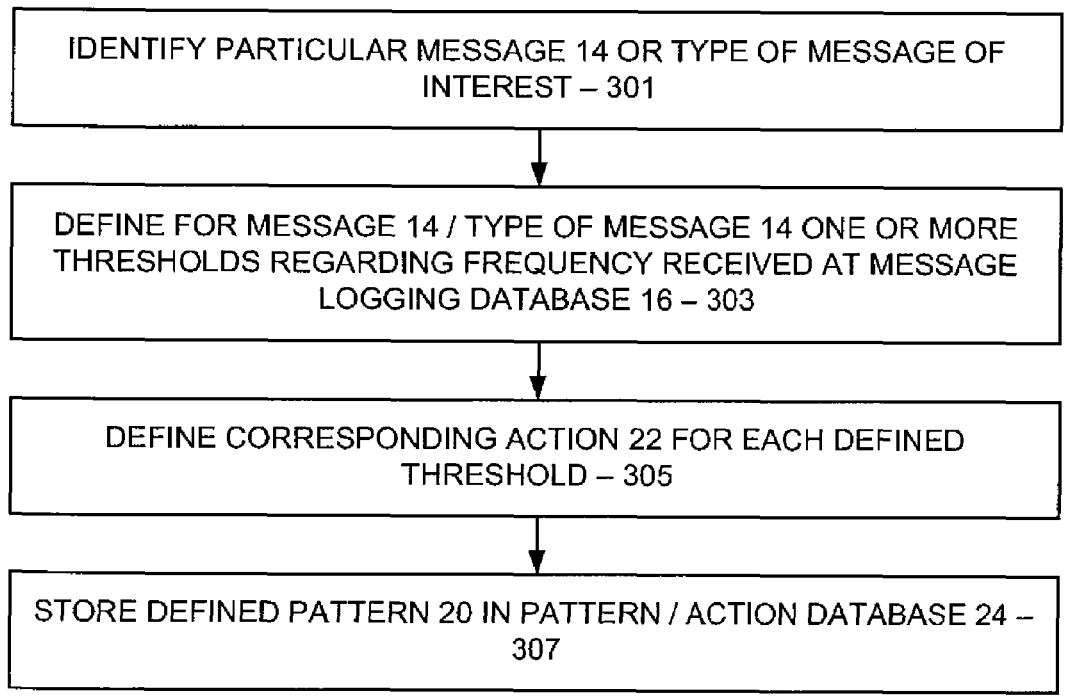
FIGS. 3-5 are flow diagrams showing key actions performed in connection with the monitoring and acting system (MAAS) of FIG. 2 to define a pattern to be stored in the pattern/action database of FIG. 2 (FIG. 3), to employ the patterns in the pattern/action database (FIG. 4), and to employ the pattern recognizer of FIG. 2 to recognize patterns based on messages in the message logging database of FIG. 2 (FIG. 5), all in accordance with various embodiments of the present innovation.

Turning now to FIG. 3, one method employed to construct such a pattern 20 is set forth. Preliminary, an operator or other person identifies a particular message 14 or type of message 14 of interest (301), and then defines for the message 14 one or more thresholds regarding the frequency with which such message is received at the message logging database 16 (303). That is, the thresholds may be defined in terms of messages 14 per unit time, be it second, minute, hour, day, etc. If multiple ones of thresholds are employed in a pattern 20, the thresholds should appear in the pattern 20 in order of increasing frequency, or the MAAS 18 should be able to determine the order of the thresholds in increasing frequency. In either case, and as may be appreciated, the order of the thresholds is significant to the MAAS 18 inasmuch as such MAAS 18 at some point may have to determine the highest frequency threshold surpassed.

At any rate, for each defined threshold, a corresponding action 22 is defined for the threshold (305). As may be seen, such defined action may actually comprise a number of actions that are performed should the defined threshold be surpassed. Finally, the defined pattern 20 including the thresholds and actions 22 thereof is appropriately stored in the pattern/action database 24 (307). Each pattern 20 in the database 24 may be set forth in an XML (extensible markup language), an INI, or any other appropriate language and stored in the database 24 in an appropriate manner. For example, pseudo-code for the above-described pattern 20 may be as follows:

Pattern Name=Pattern X
Message Monitored=[message 14 of particular type]
Threshold 1
   Threshold=greater than one per 60 minutes
   Action
   Action 1=[initiate first maintenance operation]
   Action 2=[notify operator]
Threshold 2
   Threshold=greater than one per 30 minutes
   Action
   Action 1=[initiate second maintenance operation]
   Action 2=[notify operator]
Threshold 3
   Threshold=greater than one per minute
   Action
   Action 1=[initiate shut down of system 12]
   Action 2=[notify operator]

Note here that a particular pattern 20 in the database 24 and employed by the MAAS 18 may monitor most any message 14 or type of message 14, and may set multiple thresholds, each of which has increasing periodicity and presumably increasing urgency. Note too that each threshold may be defined in most any manner that can be perceived by the MAAS 18. For example, a threshold may be defined as a number of occurrences per minute or per hour, or even as just a single occurrence.

Note too that the action 22 performed by the MAAS 18 may be most any action that the MAAS 18 can perform, presuming of course that the MAAS 18 is trusted to perform the action 22. In this regard, it may be that the MAAS 18 is always trusted to issue a notification, but is only sometimes trusted to initiate a maintenance operation, and is trusted to shut down a system 12 only in dire circumstances. Note further that if set forth in XML, a pattern 20 can include the use of logic in deciding whether to take particular actions 22.

For example, one action may be to shut down a system 12 only if the time is between 7 pm and 7 am, and otherwise to notify an operator.

Note finally that a 'combination' pattern 20 may be defined based on combinations of messages 14 or types thereof, and 'combination' thresholds for such combinations of messages 14 or types thereof may be expressed in increasingly sophisticated fashions. However, a practical limitation to such a combination pattern 20 may be the ability of the MAAS 18 to recognize same and to calculate a value for comparison to the combination thresholds thereof in a timely manner. That is to say, based on the sheer volume of messages 14 in the database 16, such a combination pattern 20 may require much more time to be handled by the MAAS 18 as compared with a relatively simple pattern.

Note that the MAAS 18 may itself compile the statistics needed to determine whether a particular threshold of a particular pattern 20 has been met. Alternatively, and as seen in FIG. 2, the MAAS 18 may employ a statistics generator 26 to compile such statistics. In particular, and as seen, and referring also to FIG. 4, such a statistics generator 26 may be coupled to the pattern/action database 24 to determine each needed statistic (401), such as for example the above-mentioned number of messages 14 of the particular type per minute or per hour. In addition, such a statistics generator 26 is coupled to the message logging database 16. Thus, based on each needed statistic, the statistics generator 26 would periodically query the database 16 for relevant messages 14, perhaps once every minute or so, and compute the statistic based thereon (403). As seen, such computed statistic may then be stored in a statistics database 28 for ease of retrieval by the MAAS 18 (405). Computing such statistics is known or should be apparent to the relevant public and therefore need not be set forth herein in any detail.

Typically, a particular statistic is calculated over a window representing a recent time period, and therefore ignores messages 14 that are too old or 'stale'. For example, to calculate a number of messages 14 per minute, it may only be necessary to go back to the most recent 1 or 2 or perhaps 5 minutes only. Also typically, a particular statistic is continuously re-calculated by the statistics generator 26 with a periodicity appropriate to the statistic. For example, a statistic expressed in units per hour might be re-calculated once a minute, while a statistic expressed in units per second might be re-calculated twenty times per second.

Figure 4:
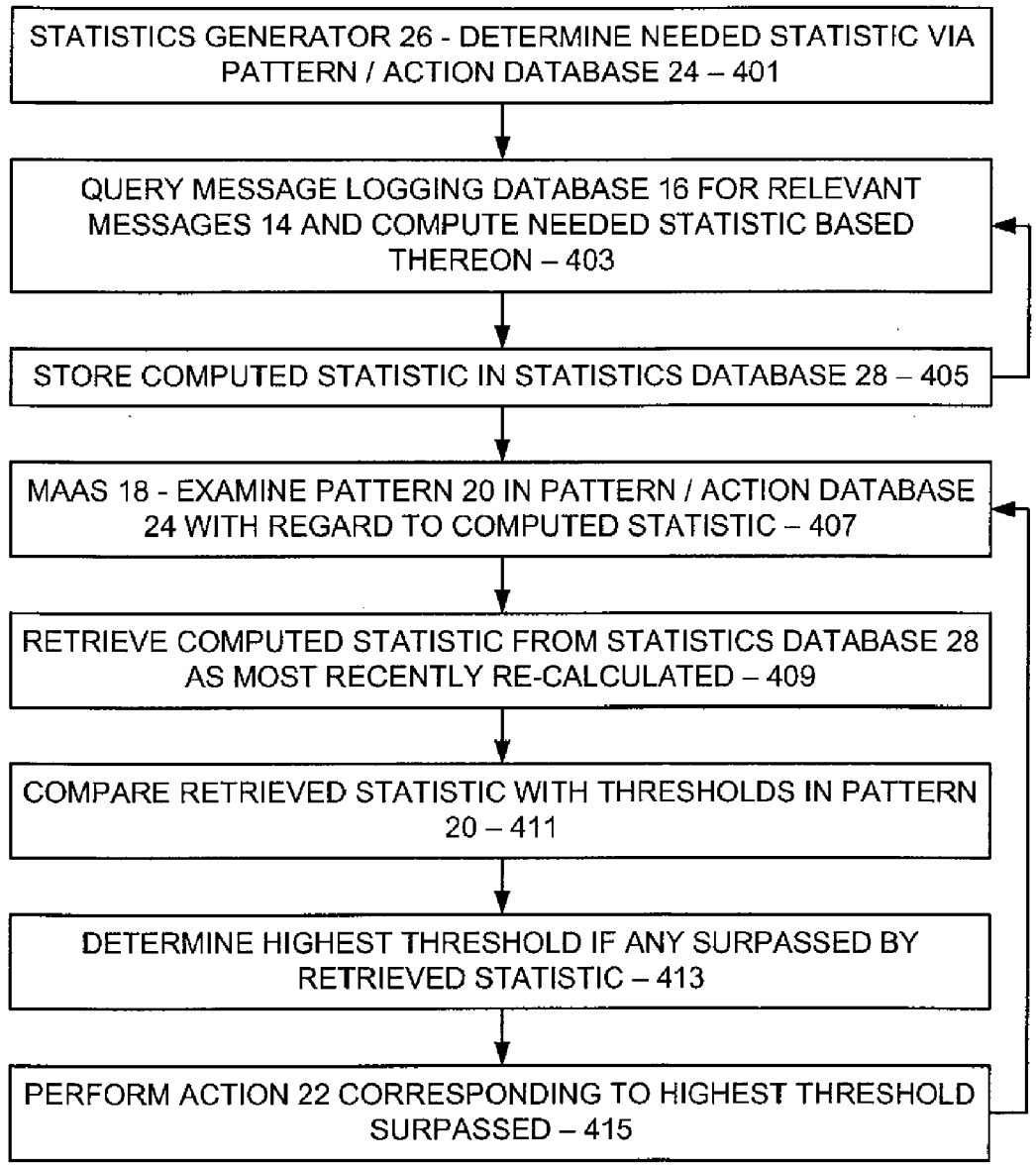

With the statistics compiled by the statistics generator 26, then, and still referring to FIG. 4, the MAAS 18 periodically examines each pattern 20 in the pattern/action database 24 with regard to a computed statistics (407). For each pattern 20, then, the MAAS 18 would retrieve the corresponding statistic from the statistics database 28 as most recently re-calculated at the statistics generator 26 (409), and compare same to the various thresholds set forth in the pattern 20 (411). Based on a determination of the highest threshold surpassed by the retrieved statistic (413), if any, the MAAS 18 would then take the action 22 corresponding thereto (415).

Identifying Patterns

Figure 5:
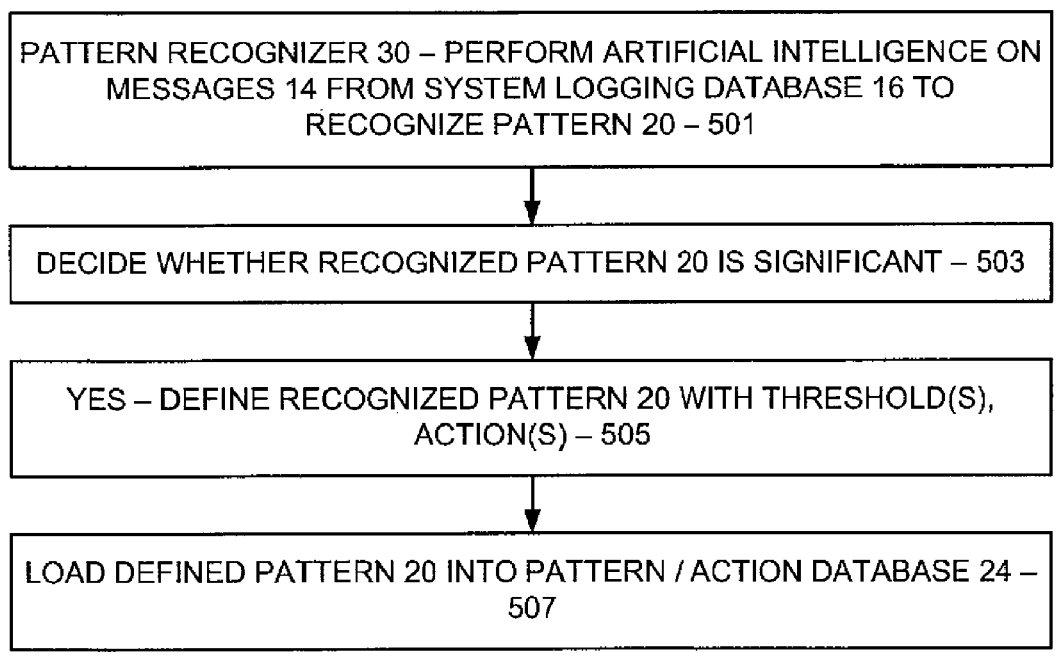

Each pattern 20 as set forth in the pattern/action database 24 may be a pattern identified by an operator or another person based on experience. In addition, and in various embodiments of the present innovation, and turning now to FIG. 5, such pattern 20 may also be identified from the messages 14 in the message logging database 16 by a pattern recognizer 30 as is shown in FIG. 2, based on automated pattern recognition.

Such automated pattern recognition is generally known and therefore need not be set forth herein in any detail other than that which is provided. Principally, in such pattern recognition, some form of artificial intelligence is performed on a set of the messages 14 from the database 16 so as to 'learn' patterns 20, perhaps based on a baseline that is updated as patterns 20 are in fact learned (501).

As may be appreciated, with such pattern recognition and pattern recognizer 30, patterns 20 may be recognized that are more subtle. For example, by examining historical amounts of messages 14 in the database 16, perhaps logged over several weeks, the pattern recognizer 30 may recognize that a particular pattern 20 occurs, but only on Fridays between 4 and 5 pm, or on the last day of each month at 9 am. Of course, such a recognized pattern 20 may or may not be significant, and accordingly part of the pattern recognizer 30 learning would be to have an operator or other person pass judgment on whether the recognized pattern 20 is in fact significant.

A pattern recognizer 30 may recognize the above-described patterns 20 that occur relatively seldom, and also may recognize the aforementioned combination patterns 20 that are based on combinations of messages 14, among other types of patterns 20. As should be appreciated, a person faced with a tremendous number of messages 14 in the message logging database 16 would likely never recognize such patterns 20 from such messages 14, especially if the patterns 20 are subtle and only involve only what could amount to only a few messages 14 among millions or perhaps billions of such messages 14 in the database 16.

Notably, a decision is made as to whether the recognized pattern 20 is significant (503), and if so the recognized pattern 20 is defined with appropriate thresholds and actions 22 (505) in a manner akin to that shown in FIG. 3 and loaded into the pattern/action database 24 (507). Such defining and loading would take place at the direction of the operator or another person or even by the pattern recognizer 30 under appropriate circumstances.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for proactively acting on systems messages 14 received and stored at a message logging database 16 or the like. Such systems and methods discern patterns 20 from the systems messages 14 in the database 16 based on statistics calculated therefrom, and take actions 22 in response according to a pattern/action database 24.

It should be appreciated that changes could be made to the embodiments described above without departing from the innovative concepts thereof. For example, although as set forth above the MAAS 18 refers to the database 24 and the statistics generator 26, one or both of such elements may be incorporated within the MAAS 18 in alternate embodiments of the present innovation. Additionally, while such elements and others are shown in FIG. 2 as being located at the center 10, at least some of such elements may instead be located remote from such center 10 in various embodiments of the present innovation. It should be understood, therefore, that this innovation is not limited to the particular embodiments disclosed, but it is intended to cover modifications within the spirit and scope of the present innovation as defined by the appended claims.

The invention claimed is:

1. A method comprising:
storing system messages in a message logging database, the system messages being issued by a plurality of computing systems;
monitoring the system messages stored in the message logging database for predetermined patterns in the system messages;
detecting a pattern in the system messages that indicates a potential system event, wherein the pattern comprises a frequency of a subset of the system messages, wherein the subset of the system messages indicates a potential system event;
determining multiple thresholds corresponding to the frequency of the subset of the system messages; and
acting in response to the pattern by taking a predetermined action corresponding to the pattern, the predetermined action intended to minimize the potential system event, wherein the predetermined action taken depends at least on which of the multiple thresholds the frequency of the subset of the system messages exceeded.

2. The method of claim 1, further comprising providing a monitoring and acting system (MAAS), wherein detecting the pattern comprises detecting, by the MAAS, the pattern.

3. The method of claim 1, wherein the predetermined action includes at least one of issuing a notification, initiating a maintenance operation, or shutting down one of the plurality of computing systems.

4. The method of claim 1, further comprising:
identifying, based on the pattern, a statistic to be computed;
querying the message logging database for relevant messages;
computing the statistic based on the relevant messages;
obtaining from the pattern a threshold value and a corresponding action to be taken if the threshold value is surpassed by the computed statistic;
comparing the computed statistic to the threshold value to determine whether the threshold value is surpassed by the computed statistic; and
upon determining that the threshold value is surpassed by the computed statistic, performing the corresponding action.

5. The method of claim 4, further comprising storing the computed statistic in a statistics database.

6. The method of claim 4, wherein the relevant messages consist of messages from a time period.

7. The method of claim 1, wherein the predetermined action comprises shutting down a system from where the system messages originated.

8. A non-transitory computer-readable medium having stored thereon computer-executable instructions causing a processor to effectuate operations, the operations comprising:
storing system messages in a message logging database, the system messages being issued by a plurality of computing systems;
monitoring the system messages stored in the message logging database for predetermined patterns in the system messages;
detecting a pattern in the system messages that indicates a potential system event, wherein the pattern comprises a frequency of a subset of the system messages, wherein the subset of the system messages indicates a potential system event;
determining multiple thresholds corresponding to the frequency of the system messages indicating a potential system event; and
acting in response to the pattern by taking a predetermined action corresponding to the pattern, the predetermined action intended to minimize the potential system event, wherein the predetermined action taken depends at least on which of the multiple thresholds the system message frequency exceeded.

9. The medium of claim 8, wherein detecting the pattern comprises detected, by a monitoring and acting system (MAAS), the pattern.

10. The medium of claim 8, wherein the predetermined action includes at least one of issuing a notification, initiating a maintenance operation, or shutting down one of the plurality of computing systems.

11. The medium of claim 8, the operations further comprising:
identifying, based on the pattern, a statistic to be computed;
querying the message logging database for relevant messages;
computing the statistic based on the relevant messages;
obtaining from the pattern a threshold value and a corresponding action to be taken if the threshold value is surpassed by the computed statistic;
comparing the computed statistic to the threshold value to determine whether the threshold value is surpassed by the computed statistic; and
upon determining that the threshold value is surpassed by the computed statistic, performing the corresponding action.

12. The medium of claim 11, the operations further comprising storing the computed statistic in a statistics database.

13. The medium of claim 11, wherein the relevant messages consist of messages from a time period.

14. The medium of claim 8, wherein the predetermined action comprises shutting down a system from where the system messages originated.

15. A system comprising:
a processor;
memory storing instructions that cause the processor to effectuate operations, the operations comprising:
storing system messages in a message logging database, wherein the system messages are issued by a plurality of computing systems;
monitoring the system messages stored in the message logging database for predetermined patterns in the system messages;
detecting a pattern in the system messages that indicates a potential system event, wherein the pattern comprises a frequency of a subset of the system messages, wherein the subset of the system messages indicates a potential system event;
determining multiple thresholds corresponding to the frequency of the subset of the system messages; and
acting in response to the pattern by taking a predetermined action corresponding to the pattern, the predetermined action intended to minimize the potential system event, wherein the predetermined action taken depends at least on which of the multiple thresholds the frequency of the subset of the system messages exceeded.

16. The system of claim 15, comprising a monitoring and acting system (MAAS).

17. The system of claim 15, wherein the predetermined action includes at least one of issuing a notification, initiating a maintenance operation, or shutting down one of the plurality of computing systems.

18. The system of claim 15, comprising a statistics generator that generates a needed statistic by:
 identifying, from the pattern, the statistic to be computed;
 querying the message logging database for relevant messages; and
 computing the statistic based on the relevant messages,
 and comprising a monitoring and acting system (MAAS) that employs the generated statistic by:
 obtaining from the pattern a threshold value and a corresponding action to be taken if the threshold value is surpassed by the computed statistic;
 comparing the computed statistic to the threshold value to determine whether the threshold value is surpassed by the computed statistic; and
 upon determining that the threshold value is surpassed by the computed statistic, performing the corresponding action.

19. The system of claim 18, wherein the statistics generator stores the generated statistic in a statistics database and the MAAS retrieves the generated statistic from the statistics database.

20. The system of claim 15, wherein the predetermined action comprises shutting down the plurality of computing systems.

* * * * *